United States Patent
Klaiber (10) Patent No.: US 7,962,909 B1
(45) Date of Patent: Jun. 14, 2011

(54) LIMITING GUEST EXECUTION

(75) Inventor: Alexander C. Klaiber, Mountain View, CA (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 1679 days.

(21) Appl. No.: 11/066,027

(22) Filed: Feb. 25, 2005

Related U.S. Application Data (60) Provisional application No. 60/569,995, filed on May 11, 2004.

(51) Int. Cl.
G06F 9/455 (2006.01)
G06F 9/46 (2006.01)

(52) U.S. Cl. .............................. 718/1; 718/107; 718/108

(58) Field of Classification Search .................... None
See application file for complete search history.

(56) References Cited

U.S. PATENT DOCUMENTS

| | | | |
|---|---|---|---|
| 5,826,084 A | 10/1998 | Brooks et al. | |
| 6,301,634 B1 * | 10/2001 | Gomi et al. | 710/267 |
| 6,523,126 B1 | 2/2003 | Brabenac | |
| 7,237,051 B2 * | 6/2007 | Bennett et al. | 710/260 |
| 7,287,197 B2 * | 10/2007 | Bennett et al. | 714/48 |
| 7,424,709 B2 * | 9/2008 | Neiger et al. | 718/1 |
| 7,475,002 B1 * | 1/2009 | Mann | 703/23 |
| 7,478,394 B1 * | 1/2009 | de Dinechin et al. | 718/108 |
| 7,620,949 B2 * | 11/2009 | Bennett et al. | 718/1 |
| 2003/0217250 A1 | 11/2003 | Bennett et al. | |
| 2004/0117532 A1 * | 6/2004 | Bennett et al. | 710/260 |
| 2004/0123288 A1 * | 6/2004 | Bennett et al. | 718/1 |
| 2005/0060702 A1 * | 3/2005 | Bennett et al. | 718/1 |
| 2005/0060703 A1 * | 3/2005 | Bennett et al. | 718/1 |
| 2005/0080970 A1 * | 4/2005 | Jeyasingh et al. | 710/266 |

OTHER PUBLICATIONS

P.H. Gum, "System/370 Extended Architecture: Facilities for Virtual Machines," IBM J. Res Develop., vol. 27, No. 6, Nov. 1983, (pp. 530-544).
"Chapter 9. Performance Monitor ," PowerPC 604—RISC Microprocessor User's Manual, 1994, (pp. 9-1-9-11).
"Operating System Writer's Guide," Pentium Pro Family Developer's Manual, vol. 3, 1996, (12 Pages).
James L. Turley, "Advanced 80386 Programming Techniques," ISBN 0-07-881342-5, (35 Pages).

* cited by examiner

*Primary Examiner* — Emerson C Puente
*Assistant Examiner* — Adam Lee
(74) *Attorney, Agent, or Firm* — Lawrence J. Merkel; Meyertons, Hood, Kivlin, Kowert & Goetzel, P.C.

(57) ABSTRACT

In one embodiment, a processor comprises an execution core configured to execute instructions including instructions comprising a guest and a circuit coupled to the execution core. The circuit is configured to monitor the execution core, and is programmable to limit an execution of the guest in the execution core to an execution interval. In another embodiment, a method comprises establishing an execution interval for a guest to be executed in a processor; and initiating execution of the guest in the processor. The processor includes a circuit configured to monitor execution of the guest to detect an end of the execution interval. A computer accessible medium storing instructions which, when executed, implement the method is also contemplated.

22 Claims, 4 Drawing Sheets

LIMITING GUEST EXECUTION

This application claims benefit of priority to U.S. Provisional Patent Application Serial No. 60/569,995, filed on May 11, 2004.

BACKGROUND

1. Field of the Invention

This invention relates to virtualization and the use of virtual machines in processors and computer systems and, more particularly, to limiting guest execution in a processor/computer system implementing virtualization.

2. Description of the Related Art

Virtualization has been used in computer systems for a variety of different purposes. For example, virtualization may be used to execute privileged software in a "container" to prevent the privileged software from directly accessing and/or making changes to at least some of the physical machine state without first being permitted to do so by a virtual machine manager (VMM) that controls the virtual machine. Such a container may prevent "buggy" or malicious software from causing problems on the physical machine. Additionally, virtualization may be used to permit two or more privileged programs to execute on the same physical machine concurrently. The privileged programs may be prevented from interfering with each other since access to the physical machine is controlled. Privileged programs may include operating systems, and may also include other software which expects to have full control of the hardware on which the software is executing. In another example, virtualization may be used to execute a privileged program on hardware that differs from the hardware expected by the privileged program.

Generally, virtualization of a processor or computer system may include providing one or more privileged programs with access to a virtual machine (the container mentioned above) over which the privileged program has full control, but the control of the physical machine is retained by the VMM. The virtual machine may include a processor (or processors), memory, and various peripheral devices that the privileged program expects to find in the machine on which it is executing. Each privileged program (and related software in some cases, such as the applications that execute on an operating system) may be referred to herein as a guest. Virtualization may be implemented in software (e.g. the VMM mentioned above) without any specific hardware virtualization support in the physical machine on which the VMM and its virtual machines execute. However, virtualization may be simplified and/or achieve higher performance if some hardware support is provided.

Generally, both the VMM and the guests may execute on the physical processors in the computer system. The VMM may schedule a guest for execution, cause the guest's state to be loaded into the physical processor, and start execution of the guest on the processor. The guest's instructions are then executed by the processor (the guest is "in control" of the processor). The VMM may thus require a mechanism to recover control of the physical processor.

Typically, the VMM uses an external interrupt timer to recover control of the processor. The timer is programmable with a time interval, and at the expiration of the time interval the timer interrupts the processor (using an external interrupt signal on the processor). The external interrupt timer is typically limited to measuring time. Additionally, the external interrupt timer may not be a very accurate measure of guest execution time, as the timer is setup by the VMM and begins timing prior to beginning execution of the guest. The location of the external interrupt timer in the computer system and configuring the timer may be platform dependent, and thus may vary from system to system. Additionally, the guest operating system (or other privileged code in the guest) may in fact expect to use such an external timer itself, since such a timer typically exists in the PC platform. In such cases, it would be necessary to virtualize the timer, such that VMM and guest can share it.

SUMMARY

In one embodiment, a processor comprises an execution core configured to execute instructions including instructions comprising a guest and a circuit coupled to the execution core. The circuit is configured to monitor the execution core, and is programmable to limit an execution of the guest in the execution core to an execution interval.

In another embodiment, a method comprises establishing an execution interval for a guest to be executed in a processor; and initiating execution of the guest in the processor. The processor includes a circuit configured to monitor execution of the guest to detect an end of the execution interval. A computer accessible medium storing instructions which, when executed, implement the method is also contemplated.

BRIEF DESCRIPTION OF THE DRAWINGS

The following detailed description makes reference to the accompanying drawings, which are now briefly described.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Virtualization Overview

Figure 1:
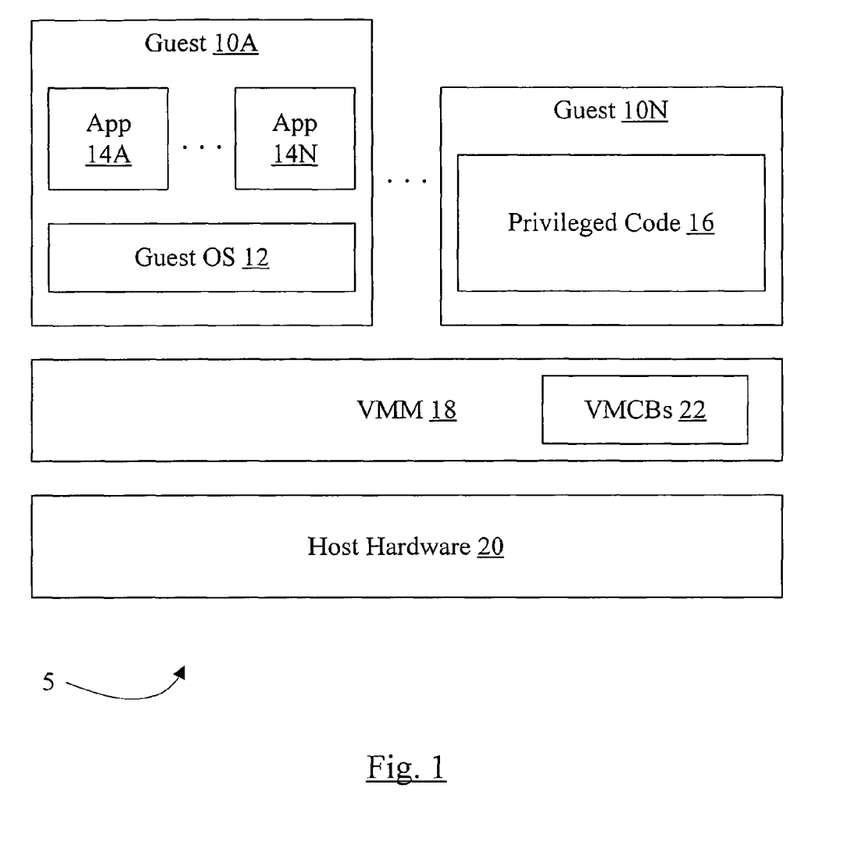
FIG. 1 is a block diagram of one embodiment of a computer system that implements virtualization.

Turning now to FIG. 1, a block diagram of one embodiment of a computer system 5 that implements virtualization is shown. In the embodiment of FIG. 1, multiple guests 10A-10N are shown. Guest 10A includes a guest operating system (OS) 12 and one or more applications 14A-14N that run on the guest OS 12. Guest 10N includes privileged code 16. The guests 10A-10N are managed by a virtual machine manager (VMM) 18. The VMM 18 and the guests 10A-10N execute on host hardware 20, which may comprise the physical hardware included in the computer system 5. In one embodiment, the VMM 18 may maintain a set of virtual machine control blocks (VMCBs) 22. There may be one VMCB 22 for each guest 10A-10N. While the VMCBs 22 are shown as part of the VMM 18 for illustration in FIG. 1, the VMCBs 22 may be stored in memory and/or on non-volatile media such as disk drives in the host hardware 20.

The host hardware 20 generally includes all of the hardware included in the computer system 5. In various embodiments, the host hardware 20 may include one or more processors, memory, peripheral devices, and other circuitry used to couple the preceding components. For example, common personal computer (PC)-style systems may include a Northbridge coupling the processors, the memory, and a graphics device that uses the advanced graphic port (AGP) interface. Additionally, the Northbridge may couple to a peripheral bus such as the peripheral component interface (PCI) bus, to which various peripheral components may be directly or indirectly coupled. A Southbridge may also be included, coupled to the PCI bus, to provide legacy functionality and/or couple to legacy hardware. In other embodiments, other circuitry may be used to link various hardware components. For example, HyperTransport™ (HT) links may be used to link nodes, each of which may include one or more processors, a host bridge, and a memory controller. The host bridge may be used to couple, via HT links, to peripheral devices in a daisy chain fashion. Any desired circuitry/host hardware structure may be used.

In some embodiments, one or more components of the host hardware may include hardware support for virtualization. For example, the processor(s) may include hardware support for virtualization, as will be described in more detail below.

The VMM 18 may be configured to provide the virtualization for each of the guests 10A-10N, and may control the access of the guests 10A-10N to the host hardware 20. The VMM 18 may also be responsible for scheduling the guests 10A-10N for execution on the host hardware 20. The VMM 18 may be configured to use the hardware support provided in the host hardware 20 for virtualization.

In some embodiments, the VMM 18 may be implemented as a "thin" standalone software program that executes on the host hardware 20 and provides the virtualization for the guests 10A-10N. Such a VMM implementation may sometimes be referred to as a "hypervisor". In other embodiments, the VMM 18 may be integrated into or execute on a host OS. In such embodiments, the VMM 18 may rely on the host OS, including any drivers in the host OS, platform system management mode (SMM) code provided by the system BIOS, etc. Thus, the host OS components (and various lower-level components such as the platform SMM code) execute directly on the host hardware 20 and are not virtualized by the VMM 18.

In various embodiments, the VMM 18 may support full virtualization, paravirtualization, or both. Furthermore, in some embodiments, the VMM 18 may concurrently execute guests that are paravirtualized and guests that are fully virtualized.

With full virtualization, the guest 10A-10N is not aware that virtualization is occurring. Each guest 10A-10N may have contiguous, zero based memory in its virtual machine, and the VMM 18 may use shadow page tables to remap from guest virtual addresses to host physical addresses (effectively the remapping the guest "physical address" assigned by memory management software in the guest 10A-10N to host physical address). Using the shadow page tables for each guest 10A-10N, the VMM 18 may ensure that guests do not access other guest's physical memory in the host hardware 20. In one embodiment, in full virtualization, guests 10A-10N do not directly interact with the peripheral devices in the host hardware 20.

With para-virtualization, guests 10A-10N may be at least partially VM-aware. Such guests 10A-10N may negotiate for memory pages with the VMM 18, and thus remapping guest physical addresses to host physical addresses may not be required. In one embodiment, in paravirtualization, guests 10A-10N may be permitted to directly interact with peripheral devices in the host hardware 20. At any given time, a peripheral device may be "owned" by a guest or guests 10A-10N. In one implementation, for example, a peripheral device may be mapped into a protection domain with one or more guests 10A-10N that currently own that peripheral device. Only guests that own a peripheral device may directly interact with it. There may also be a protection mechanism to prevent devices in a protection domain from reading/writing pages allocated to a guest in another protection domain (e.g. using device exclusion vectors for each protection domain that define which physical pages are accessible to the device and which are not).

As mentioned previously, the VMM 18 may maintain a VMCB 22 for each guest 10A-10N. The VMCB 22 may generally comprise a storage area that is allocated by the VMM 18 for the corresponding guest 10A-10N. In one embodiment, the VMCB 22 may comprise a page of memory, although other embodiments may use larger or smaller memory areas and/or may use storage on other media such as non-volatile storage. In one embodiment, the VMCB 22 may include the guest's processor state, which may be loaded into a processor in the host hardware 20 when the guest is scheduled to execute and may be stored back to the VMCB 22 when the guest exits (either due to completing its scheduled time, or due to one or more intercepts that the processor detects for executing the guest). In some embodiments, only a portion of the processor state is loaded via the instruction that transfers control to the guest corresponding to the VMCB 22 (the "start virtual machine (SVM)" instruction), and other desired state may be loaded by the VMM 18 prior to executing the SVM instruction. Similarly, in such embodiments, only a portion of the processor state may be stored to the VMCB 22 by the processor on guest exit and the VMM 18 may be responsible for storing any additional state as needed. In other embodiments, the VMCB 22 may include a pointer to another memory area where the processor state is stored.

In one embodiment, the VMM 18 may also have an area of memory allocated to store the processor state corresponding to the VMM 18. When the SVM instruction is executed, the processor state corresponding to the VMM 18 may be saved in the area. When the guest exits, the processor state from the area may be reloaded from the area to permit the VMM 18 to continue execution. In one implementation, for example, the processor may implement a register (e.g. a model specific register, or MSR) to store the address of the VMM 18 save area.

In one embodiment, the VMCB 22 may also include a set of intercept indications, one indication for each intercept event that the processor supports. The intercept indication may indicate whether or not the processor is to intercept the corresponding event. As used herein, an event is "intercepted" in a guest if, should the event occur in the guest, the processor exits the guest for processing of the event (or other processing) in the VMM 18. Thus, in this embodiment, the VMM 18 may configure the processor to intercept only those events that the VMM 18 does not wish the guest 10A-10N to handle internally. Events may include instructions (that is, intercept an instruction instead of executing it), interrupts, exceptions, and/or any other desired events that may occur during guest execution. In other embodiments, the processor may enter a guest mode and intercept on all events supported by the processor.

In one embodiment, the VMCB 22 may further include other control bits that may cause the processor to perform certain actions upon loading the VMCB 22. For example, the control bits may include indications to flush the TLB in the processor. Other control bits may specify the execution environment for the guest (e.g. interrupt handling modes, an address space identifier for the guest, etc.). Still other control bits may be used to communicate an exit code describing why the guest exited, etc.

Generally, a "guest" may comprise any one or more software programs that are to be virtualized for execution in the computer system 5. A guest may include at least some code that executes in privileged mode, and thus expects to have full control over the computer system on which it is executing. As mentioned previously, guest 10A is an example in which the guest includes a guest OS 12. The guest OS 12 may be any OS, such as any of the Windows OSs available from Microsoft Corp., (Redmond, Wash.), any UNIX-type operating system such as Linux, AIX from IBM Corporation (Armonk, N.Y.), Solaris from Sun Microsystems, Inc. (Santa Clara, Calif.), HP-UX from Hewlett-Packard Company (Palo Alto, Calif.), etc. The guest 10N is an example of a guest that comprises non-OS privileged code 16.

It is noted that the letter "N" when used herein in reference numerals such as 10N is meant to generically indicate any number of elements bearing that reference numeral (e.g. any number of guests 10A-10N, including one guest). Additionally, different reference numerals that use the letter "N" (e.g. 10N and 14N) are not intended to indicate like numbers of the different elements are provided (e.g. the number of guests 10A-10N may differ from the number of applications 14A-14N) unless otherwise noted.

Limiting Guest Execution

The processor(s) in the host hardware 20 may include a guest limit circuit that is programmable to limit the guest's execution on the processor. The guest limit circuit may be programmable, e.g., with an execution interval for the guest. The guest limit circuit may monitor the processor's execution core to detect an end of the execution interval, and may cause the processor to exit the guest at the end of the execution interval. As used herein, an execution interval refers to any period allocated for the guest to execute. The guest may exit during the execution interval if an intercept is detected. However, if the guest is still executing at the end of the execution interval (i.e. no intercepts have been detected), the guest limit circuit may cause the guest to exit (e.g. similar to exiting due to an intercept). The execution interval may be measured in any desired fashion. For example, the execution interval may be a period of time (e.g. real time, or measured in terms of processor clock cycles). The execution interval may be defined by a number of detections of a given event or events in the processor. For example, the event may be the execution of an instruction (and thus the execution interval may be defined by the number of guest instructions executed). The event may be a performance monitor-type event. Generally, a performance monitor-type event may be an event that is typically tracked by performance monitoring hardware in the processor for subsequent performance analysis. Performance monitor-type events may include, e.g., cache misses, memory references, input/output (I/O) operations, instructions executed, instructions dispatched, instructions completed, translation lookaside buffer (TLB) misses, branch mispredictions, branch behavior (taken/not-taken), external communication activities, etc.

In some embodiments, the inclusion of the guest limit circuit in the processor may permit a relatively accurate measurement of the execution interval. For example, the guest limit circuit may be made aware of when the guest actually begins execution in the processor. Additionally, in some embodiments, the guest limit circuit may closely monitor operation of the processor's execution core during guest execution, which may permit accurate detection of events that define the execution interval for the guest. Since the guest limit circuit is included in the processor, it may be platform independent, in some embodiments.

In some embodiments, the guest limit circuit may be configured to monitor a variety of events, and may be programmable to select one or more of the events to monitor for a given execution interval. For example, the guest limit circuit may count the occurrences of the selected event to detect the end of the execution interval. In one particular embodiment, an execution interval may be defined as the number of instructions executed. Such an embodiment may be used, for example, to deterministically reexecute a guest from a given checkpoint.

In some embodiments, the guest limit circuit may be configured or programmable to monitor multiple events separately (e.g. using a counter for each event). Each counter may be configured to monitor a different event, or may be programmable to select among events to monitor. The guest limit circuit may be configured to cause a guest exit if any of the limits are reached. Alternatively, the guest limit circuit may be configured to cause a guest exit only if all selected limits have been reached.

Figure 2:
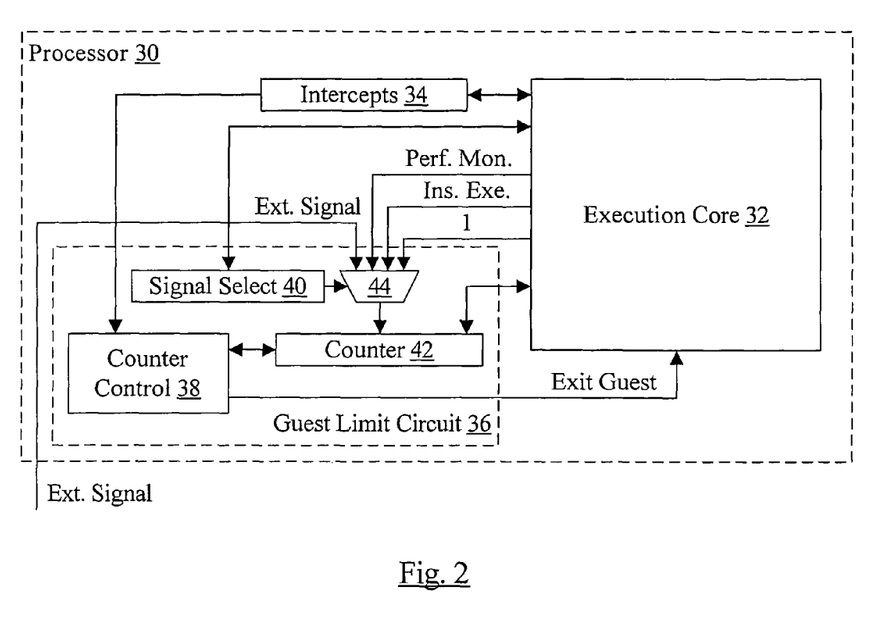
FIG. 2 is a block diagram of a portion of one embodiment of a processor.

FIG. 2 is a block diagram illustrating one embodiment of a processor 30 that may be included in the host hardware 20 and may provide support for limiting guest execution to an execution interval. In the illustrated embodiment, the processor 30 includes an execution core 32, an intercepts register 34, and a guest limit circuit 36. The execution core 32 is coupled to the intercepts register 34 and the guest limit circuit 36. In the illustrated embodiment, the guest limit circuit 36 includes a counter control circuit 38, a signal select register 40, a counter 42, and a multiplexor (mux) 44. The counter control circuit 38 is coupled to the intercepts register 34, the counter 42, and execution core 32 (via an exit guest signal). The signal select register 40 is coupled to the execution core 32 and the mux 44. The mux 44 is coupled to receive various signals from the execution core 32 and to the counter 42.

Generally, the execution core 32 is configured to execute the instructions defined in the instruction set architecture implemented by the processor 30 (e.g. the x86 instruction set architecture, including AMD64™ extensions, in some embodiments). The instructions may be instructions forming a guest 10A-10N, the VMM 18, etc. The execution core 32 may employ any construction. For example, the execution core 32 may be a superpipelined core, a superscalar core, or a combination thereof. Alternatively, the execution core 32 may be a scalar core, a pipelined core, a non-pipelined core, etc. The execution core 32 may employ out of order speculative execution or in order execution in various embodiments. The execution core 32 may include microcoding for one or more instructions or other functions, in combination with any of the above constructions.

The intercepts register or registers 34 may be configured to store the intercepts included in the VMCB 22 of a guest, and the execution core 32 may be configured to monitor for various intercepts indicated in the intercepts register. The intercepts register 34 may be loaded from the VMCB 22 of a guest 10A-10N when execution of that guest 10A-10N is initiated (e.g. using the SVM instruction described above). If the execution core 32 detects an interceptable event and the intercepts register indicates that the detected event is being intercepted, the execution core 32 may exit the guest being executed and return to the VMM 18. If no intercepts are coded in the intercepts register, then a guest is not in execution. In other embodiments, there may be a "guest mode" bit and all interceptable events may be intercepted. Generally, exiting the guest may include interrupting execution of the guest, saving at least a portion of the guest's processor state (e.g. in the guest's VMCB 22), and invoking the host (e.g. the VMM 18).

The guest limit circuit 36 may be programmable to limit the execution of a guest to an execution interval. In the illustrated embodiment, a guest is considered to be in execution if the intercepts register 34 indicates that at least one intercept is enabled. Accordingly, the counter control circuit 38 is coupled to the intercepts register 34 to detect whether or not any intercepts are enabled in the intercepts register 34. In other embodiments, the guest limit circuit 36 may be informed that guest execution is starting in other fashions. For example, the execution core 32 may signal that the SVM instruction has completed (and thus execution is proceeding at the first instruction in the guest, at the instruction pointer value provided in the guest's processor state in the VMCB 22). In yet another embodiment, if a guest mode bit or other indication is implemented, the counter control circuit 38 may be coupled to receive the guest mode bit/indication.

The guest limit circuit 36 is configured to monitor one or more events during guest execution to limit guest execution to the execution interval. In some embodiments, the guest limit circuit 36 may monitor a fixed set of one or more events. In other embodiments, such as the embodiment shown in FIG. 2, the event or events being monitored may be programmable in the guest limit circuit 36. For example, in the illustrated embodiment, the execution core 32 may output one or more signals indicating various events, and the guest limit circuit 36 may select the desired event through the mux 44 as indicated via the signal select register 40. Thus, one event may be selected in this embodiment. Other embodiments may permit the selection of multiple events. The guest limit circuit 36, in the illustrated embodiment, uses the counter 42 to count events occurring during execution of the guest in the processor 30. The counter 42 is configured to count input events supplied, in this embodiment, from the mux 44. In embodiments in which the events being monitored are fixed, the counter 42 may count input events supplied directly to the counter 42. In one implementation, the counter 42 may be loaded with the number of events that define the execution interval (the "event count"), and the counter may decrement the event count in response to the indication of an event. When the counter 42 reaches zero (or rolls over), the end of the execution interval is detected. In other implementations, the counter 42 may be initialized to zero and may increment. The counter 42 may be compared to another register that stores the event count, and the counter control circuit 38 may detect that the execution interval has ended responsive to the counter 42 equalling or exceeding the event count. The embodiment employing the loading of the counter 42 with the event count and decrementing the count will be used as an example for the remainder of this description.

When the guest limit circuit 36 (and more particularly the counter control circuit 38 in the illustrated embodiment) detects the end of the execution interval, the guest limit circuit 36 signals a guest exit to the execution core 32. The execution core 32 may exit the guest in response to the signal from the guest limit circuit 36, similar to exiting due to the detection of an intercept indicated in the intercepts registers 34. The execution core 32 may update the exit code in the guest's VMCB 22 to indicate that the end of the execution interval was detected as the reason for exit.

The signals from the execution core 32 to the guest limit circuit 36 in the illustrated embodiment include a signal indicating that an instruction has been successfully executed (Ins. Exe. in FIG. 2). If the number of instructions executed is the event being monitored in the guest limit circuit 36, the counter 42 may count in response to an assertion of the Ins. Exe. signal. In other embodiments, the signal may be an instruction count indicating how many instructions have been successfully executed in a given clock cycle. In such embodiments, the counter 42 may decrement by the instruction count.

The signals from the execution core 32 to the guest limit circuit 36 also include a constant "1" in this embodiment. The constant may be selected to count clock cycles as the monitored event. Thus, each clock cycle, the counter 42 may decrement since the constant 1 is always asserted. In other embodiments, a signal may be asserted low to the counter and a constant "0" may be used instead of a constant 1.

The signals from the execution core 32 to the guest limit circuit 36 may include a set of one or more performance monitor-type signals (e.g. cache miss, memory reference, I/O operation, etc.). The signals are shown in FIG. 2 as the Perf. Mon. signals. The signal select register 40 may be programmable to cause the mux 44 to select one of the performance monitor-type signals. The counter 42 may decrement responsive to assertion of the selected performance monitor-type signals.

In some embodiments, the guest limit circuit 36 may also be programmable to select an external signal as an event to be monitored (Ext. Signal in FIG. 2). Such a selection may permit external control of the execution interval. For example, a signal indicating the passing of real time may be supplied from as the external signal.

In one embodiment, the counter 42 and the signal select register 40 may be addressable using instructions executable by the execution core 32. The VMM 18 may include the instructions to establish the execution interval in the guest limit circuit 36 prior to starting the guest 10A-10N on the processor 30. In other embodiments, the guest limit circuit 36 may be initialized from the VMCB 22. The VMM 18 may include instructions to program the desired execution interval into the VMCB 22.

As used herein, the term register refers to any storage location implemented in the processor that is accessible using an instruction. Registers may be implemented in various fashions. For example, registers may be implemented as any sort of clocked storage devices such as flops, latches, etc. Registers may also be implemented as memory arrays, where a register address may be used to select an entry in the array. Any combination of implementations may be used in various embodiments of the processor 30.

Figure 3:
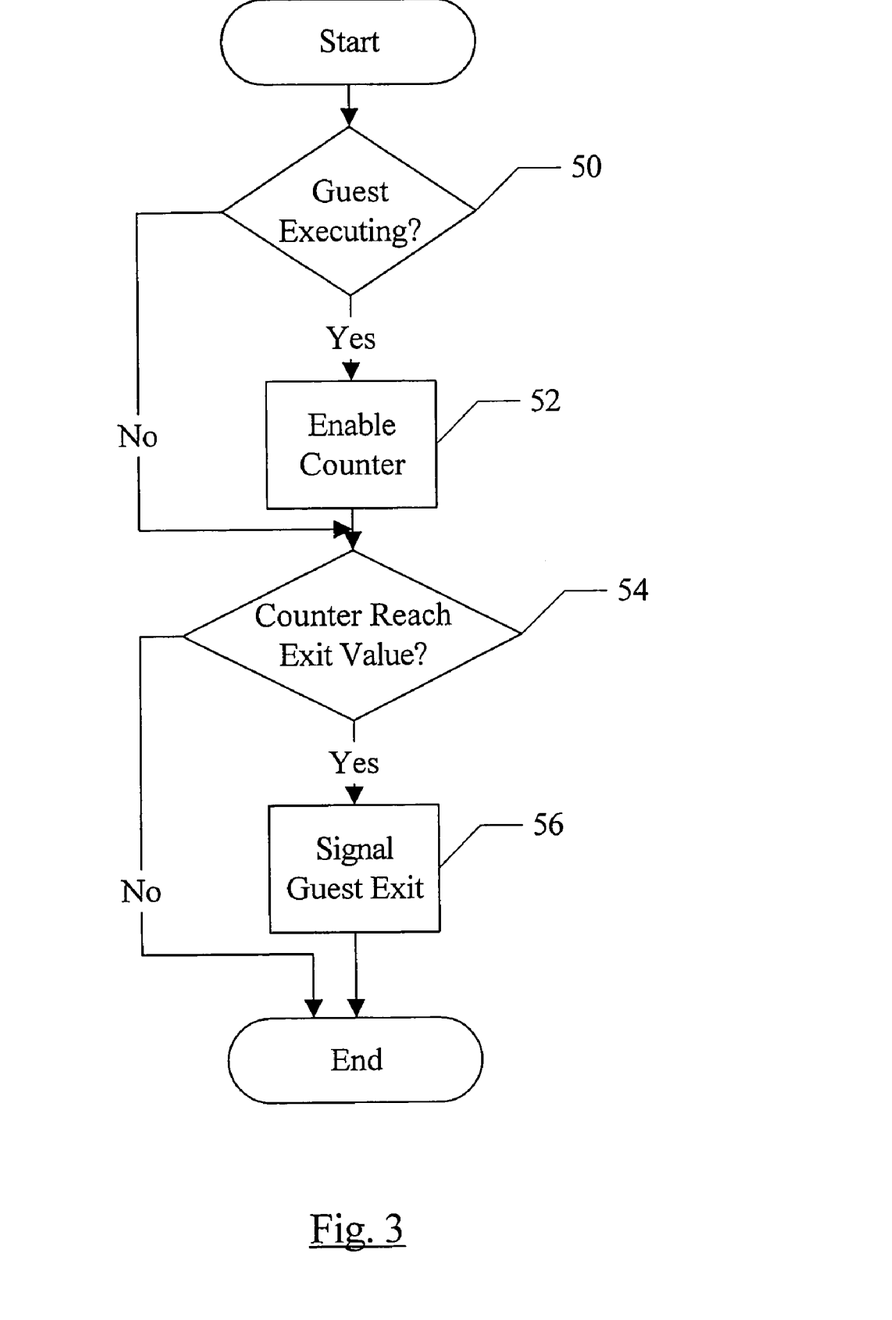
FIG. 3 is a flowchart illustrating operation of one embodiment of a control circuit shown in FIG. 2.

Turning now to FIG. 3, a flowchart is shown illustrating operation of one embodiment of the counter control circuit 38. The counter control circuit 38 may comprise circuitry which implements the operation shown in FIG. 3. While blocks are shown in a particular order in FIG. 3 for ease of understanding, blocks may be performed in parallel by combinatorial logic circuitry in the counter control circuit 38. For example, the decision blocks 50 and 54 are independent and circuitry implementing the corresponding operations may operate in parallel. Blocks may be pipelined over multiple clock cycles in various embodiments.

The counter control circuit 38 is configured to detect that a guest is executing (decision block 50). For example, in the embodiment illustrated in FIG. 2, the counter control circuit 38 may detect that a guest is executing based on whether or not one or more intercepts are enabled in the intercepts register 34. In other embodiments, the processor 30 may implement a guest mode bit and the counter control circuit 38 may receive the guest mode bit. In still other embodiments, the execution core 32 may signal the counter control circuit 38 to indicate that guest execution is starting (e.g. upon completion of the SVM instruction without detecting an exception). If the counter control circuit 38 detects that a guest is executing (decision block 50, "yes" leg), the counter control circuit 38 enables the counter 42 (block 52). That is, the counter 42 may respond to event indications by incrementing or decrementing. If the counter 42 is not enabled, the counter 42 may generally not respond to event indications. In this manner, the counter 42 may count events when the guest is executing and not count events when a guest is not executing. Thus, the VMM 18 may load the counter 42 prior to a guest beginning execution, and the counter 42 may not begin counting events until the guest begins executing.

Additionally, the counter control circuit 38 may determine if the counter 42 has reached the exit value (decision block 54). The exit value may be the value of the counter at which a guest exit should be signalled since the execution interval has expired. For example, in embodiments in which the counter 42 decrements from the event count value, the exit value may be zero. In embodiments in which the counter 42 increments the event count value, the exit value may be the event count value. If the counter 42 has reached the exit value (decision block 54, "yes" leg), the counter control circuit 38 may signal a guest exit to the execution core 32 (block 56).

Figure 4:
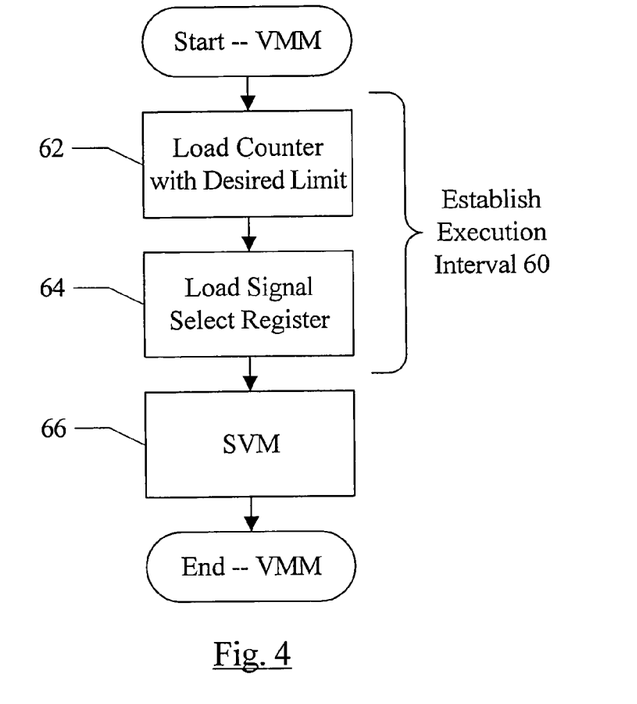
FIG. 4 is a flowchart illustrating operation of one embodiment of a VMM in starting a guest execution.

Turning now to FIG. 4, a flowchart illustrating one embodiment of a portion of the VMM 18 for initiating execution of a guest 10A-10N is shown. The VMM 18 may comprise instructions which, when executed, implement the operation shown in FIG. 4.

The VMM 18 may establish the execution interval for the guest 10A-10N (reference numeral 60). In various embodiments, the execution interval may be established in different fashions. For example, in the illustrated embodiment, the VMM 18 may include instructions that address the counter 42 and the signal select register 44, loading the registers with the desired values to set the execution interval. Thus, the VMM 18 may load the counter 42 with the desired limit (e.g. event count) (block 62) and may load the signal select register 44 to select the desired event (block 64). In other embodiments, the execution core 32 may load the counter 42 and the signal select register 44 from the VMCB 22, and the VMM 18 may comprise instructions to write the VMCB 22 with the desired values to set the execution interval. The VMM 18 may then execute the SVM instruction to initiate execution of the guest 10A-10N on the processor 30 (block 66). Alternatively, the SVM instruction may be defined to enable the guest limit circuit as part of starting guest execution.

Figure 5:
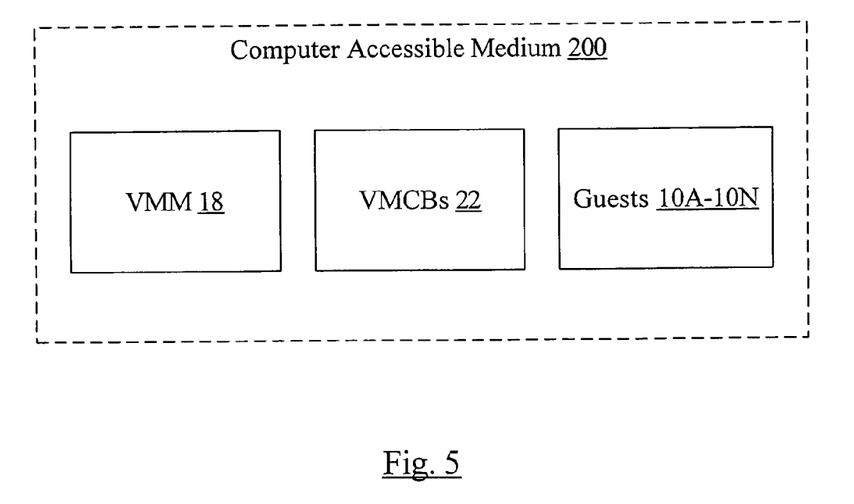
FIG. 5 is a block diagram of one embodiment of a computer accessible medium.

Turning now to FIG. 5, a block diagram of a computer accessible medium 200 is shown. Generally speaking, a computer accessible medium may include any media accessible by a computer during use to provide instructions and/or data to the computer. For example, a computer accessible medium may include storage media such as magnetic or optical media, e.g., disk (fixed or removable), tape, CD-ROM, or DVD-ROM, CD-R, CD-RW, DVD-R, DVD-RW, volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc., as well as media accessible via transmission media or signals such as electrical, electromagnetic, or digital signals, conveyed via a communication medium such as a network and/or a wireless link. The computer accessible medium 200 in FIG. 5 may store one or more of the VMM 18, one or more VMCBs 22, and/or guests 10A-10N. The VMM 18 may comprise instructions which implement the operations described for the VMM 18 herein. Generally, the computer accessible medium 200 may store any set of instructions which, when executed, implement a portion or all of the operations shown in FIG. 4. The computer accessible medium 200 may, in some embodiments, be part of the host hardware 20.

Numerous variations and modifications will become apparent to those skilled in the art once the above disclosure is fully appreciated. It is intended that the following claims be interpreted to embrace all such variations and modifications.

What is claimed is:

1. A processor comprising:
an execution core configured to execute instructions including instructions comprising a guest; and
a circuit coupled to the execution core and configured to monitor the execution core, wherein the circuit:
is configured to detect that the guest is executing responsive to monitoring the execution core,
is programmable to limit an execution of the guest in the execution core to an execution interval,
is configured to limit the execution of the guest to the execution interval responsive to detecting that the guest has been executing for a length of the execution interval,
is programmable to select at least one event to monitor from a predetermined set of monitorable events that are detectable from the guest execution,
comprises a counter configured to measure the length of the execution interval by counting responsive to detecting the at least one event,
is configured to enable the counter responsive to detecting that the guest is executing, and
is configured to signal the execution core to exit the guest to limit the execution of the guest to the execution interval responsive to detecting, via the counter, that the guest has executed for the length of the execution interval in response to reaching a limit corresponding to the at least one event.

2. The processor as recited in claim 1 wherein the execution interval is defined by a number of instructions from the guest executed by the execution core.

3. The processor as recited in claim 1 wherein the execution interval is defined as a period of time.

4. The processor as recited in claim 1 wherein the execution interval is defined by a number of performance monitor-type events.

5. The processor as recited in claim 4 wherein the performance monitor-type events comprise a number of cache misses detected by the execution core during execution of the guest.

6. The processor as recited in claim 4 wherein the performance monitor-type events comprise a number of memory references occurring during execution of the guest.

7. The processor as recited in claim 4 wherein the performance monitor-type events comprise a number of input/output operations occurring during execution of the guest.

8. The processor as recited in claim 1 wherein the execution core is configured to output at least one signal indicative of the at least one event, and wherein the circuit is coupled to receive and monitor the at least one signal to detect the respective at least one event.

9. The processor as recited in claim 8 wherein the circuit is configured to separately monitor two or more events.

10. The processor as recited in claim 9 wherein the circuit is configured to detect an end of the execution interval responsive to reaching limits for each of the two or more events.

11. A method comprising:
- establishing an execution interval for a guest to be executed in a processor, the processor including a circuit configured to monitor execution of the guest to detect an end of the execution interval;
- programming the circuit to select at least one event to monitor from a predetermined set of monitorable events that are detectable from guest execution;
- establishing the execution interval by initializing a counter in the circuit to measure a length of the execution interval by counting responsive to detecting the at least one event;
- initiating execution of the guest in the processor;
- the circuit detecting that the guest is executing responsive to monitoring the processor;
- the circuit enabling the counter to update responsive to detecting that the guest is executing; and
- the circuit limiting the execution of the guest to the execution interval responsive to detecting the end of the execution interval, wherein the circuit detecting the end of the execution interval is responsive to the counter reaching a limit corresponding to the at least one event.

12. The method as recited in claim 11 wherein the execution interval is defined by a number of instructions from the guest executed by the processor.

13. The method as recited in claim 11 wherein the execution interval is defined as a period of time.

14. The method as recited in claim 13 wherein the period of time is measured in clock cycles.

15. The method as recited in claim 11 wherein the execution interval is defined by a number of performance monitor-type events.

16. The method as recited in claim 15 wherein the performance monitor-type events comprise a number of cache misses detected by the processor during execution of the guest.

17. The method as recited in claim 15 wherein the performance monitor-type events comprise a number of memory references occurring during execution of the guest.

18. The method as recited in claim 15 wherein the performance monitor-type events comprise a number of input/output operations occurring during execution of the guest.

19. A processor comprising:
- an execution core configured to execute instructions including instructions comprising a guest; and
- a circuit coupled to the execution core and configured to monitor the execution core, wherein the circuit:
  - is programmable to select at least one event to monitor from a predetermined set of monitorable events that are detectable from the guest execution,
  - is configured to detect that the guest is executing responsive to monitoring the execution core,
  - is configured to cause a guest exit for the guest in the execution core responsive to detecting a number of occurrences of the at least one event has reached a limit in the execution core during execution of the guest, and
  - is configured to update the detected number of occurrences only during execution of the guest.

20. The processor as recited in claim 19 wherein the circuit is programmable with the number of occurrences to detect prior to causing the guest exit.

21. The processor as recited in claim 19 wherein the one or more events include an instruction execution by the execution core.

22. The processor as recited in claim 19 wherein the one or more events include events generated for performance monitoring in the processor.

* * * * *